United States Patent Office 3,761,437
Patented Sept. 25, 1973

3,761,437
LASER ENERGY ABSORBING COMPOSITION CONTAINING A COPPER SALT

Richard J. Hovey, Sturbridge, Mass., assignor to American Optical Corporation, Southbridge, Mass.

No Drawing. Continuation-in-part of abandoned application Ser. No. 861,447, Sept. 26, 1969. This application July 13, 1971, Ser. No. 162,298
Int. Cl. C08f 45/56
U.S. Cl. 260—29.1 R 15 Claims

ABSTRACT OF THE DISCLOSURE

A laser energy absorbing composition for use in ink to render the same erasable by use of a laser beam. A copper salt is dissolved in the ink. The $Cu^{++}$ ion absorbs radiation in the infrared region and a laser emitting such infrared radiation will effectively erase ink containing the copper ion.

BACKGROUND OF THE INVENTION

This application is a continuation-in-part of my copending application, Ser. No. 861,447, filed Sept. 26, 1969, now abandoned.

The present invention is related to energy absorbing compositions in general and in particular to a laser energy absorbing composition for use in ink so as to render the same erasable by means of laser radiation.

In certain applications, as for example where printed matter is to be scanned by optical scanners as in computer use, it is important that any erasures be made so that the original character is not discernible by the optical scanner.

Laser radiation has proven to be effective for making such erasures. The problems encountered in such a laser application are to make such an apparatus economical and to remove only the character from the paper without damaging the paper. Maximum character removal with minimum or no paper damage can best be realized by providing an ink, for the printing of such characters, having enhanced energy absorbing characteristics. That is, the ink should be such as to provide an optimum energy absorption level at the particular wavelength at which the associated laser operates.

Accordingly, it is an object of the present invention to provide a compound to be used as a solute in ink to enhance the laser energy absorption of the ink.

Other objects, advantages and features of the present invention will become apparent from the following description thereof.

DESCRIPTION

In general, the composition of this invention includes a copper salt dissolved in a suitable matrix material. This solution constitutes the active or energy absorbing medium. The salt-matrix solution is in turn dissolved in a liquid vehicle which is effective to maintain the liquid state of the entire composition. The requisite properties of the vehicle are a low vapor pressure and mutual solubility therein of the copper salt and the matrix material. Examples of such a vehicle are glycerin and high molecular weight alcohols. These are representative examples of organic solvents which in general may be used. Many of the salt-matrix solutions hereinafter disclosed are also soluble in water.

One composition prepared and found suitable for the above purpose is a solution of the salt copper chloride in a matrix of polyvinyl acetate. These compounds are soluble in each other and they are both soluble in a suitable vehicle such as glycerin. The copper chloride is in the range of 15–25% by weight of the copper chloride-polyvinyl acetate solution. This composition of copper chloride and polyvinyl acetate is an effective absorber of energy in the infrared region, specifically the 1.06 micron radiation wavelength of neodymium doped glass lasers.

Other salts which are satisfactory for the purpose of the present invention are such copper nitrate and copper acetate dissolved in a polyvinyl acetate matrix. The copper nitrate is preferably present at 15–20% by weight and the copper acetate is present at 1–3% by weight of the salt-matrix solution.

Other combinations in which the polyvinyl acetate matrix is replaced by polyvinyl pyrrolidone may also be used. With this latter matrix material, copper chloride (2–4% by weight), copper nitrate (7–9% by weight), copper acetate (2–4% by weight), copper perchlorate (10–14% by weight), and copper sulfate (2–4% by weight) may be used.

Another suitable matrix material is polyvinyl butyral. A solution of copper nitrate (8–10% by weight) with polyvinyl butyral has also been found satisfactory.

In the foregoing combinations, the percentages given are percentages of salt in the salt-matrix solution. These solutions are all copper-doped plastics, which may also be hereinafter designated as plastic A. In each case, a plastic A is dissolved in a suitable vehicle or solvent B which acts as a liquefier or plasticizer.

Among the foregoing combinations, the copper cation with the chloride anion is presently preferred as it provides an absorption peak closer to the infrared region of the neodymium doped glass laser which is also the presently preferred radiation source. Specifically, a solution of copper chloride and polyvinyl acetate (plastic A) in which the copper chloride is 20.6% by weight of the solution and the polyvinyl acetate is 79.4%, this plastic A in turn dissolved in an equal weight of glycerine is the best mode now contemplated by the inventor for achieving the object of this invention. That is, the copper chloride-polyvinyl acetate (plastic A) is 50% by weight of the copper chloride-polyvinyl acetate-glycerine solution. The foregoing specific example is provided only in compliance with the Patent Office requirement that "the best mode contemplated by the inventor of carrying out his invention be set forth." The invention disclosed herein is not limited in any way by the foregoing "best mode." In fact, the specific amount of vehicle is not material to the invention. The essential thing is to get the salt-matrix material on paper as an ink. A vehicle simply provides a means by which the ink is rendered fluid. Various viscosities might be desired depending on the application, and thus the concentration of the salt-matrix in the vehicle is variable.

In the foregoing description, various exemplary compositions have been set forth with mention of preferred ranges. It should be understood, however, that minimums and maximums of the various constituents may be varied. The lower limit is that quantity or quantities which will produce an optically visible or machine readable (for example in the infrared or ultraviolet) mark or character and which will later absorb sufficient laser energy to self-destruct without destroying the medium upon which the mark or character is placed. The upper limit is dictated by such criteria as cost, energy absorption of such high degree that the medium upon which the mark or character is placed may be destroyed, such practical problems as consistency and related problems of application, etc. Thus, as a practical matter, the selected $Cu^{++}$ material and matrix are present in quantities sufficient to reproduce data on a carrier medium and yet be capable of self-destruction by absorption of laser energy without destruction of the carrier.

It may occur to others of ordinary skill in the art to make modifications of the present invention which will lie within its concept and scope and not constitute a departure. Accordingly, it is intended that the invention be not limited by the details of its description but only by the following claims.

What is claimed is:

1. An ink composition including a low molecular weight matrix material of polyvinyl acetate, a copper salt dissolved therein, said copper salt being selected from the group consisting of copper chloride, copper nitrate and copper acetate, the solution of copper salt and polyvinyl acetate being further dissolved in a vehicle to keep the same in a liquid state at room temperature and the amount of said copper salt being sufficient to erase printed characters of said ink through absorption of laser energy.

2. An ink composition as defined in claim 1 in which said salt is copper chloride.

3. An ink composition as defined in claim 2 in which said copper chloride is 15–25% by weight of the salt-matrix solution.

4. An ink composition as defined in claim 1 in which said salt is copper nitrate and is 15–20% by weight of the salt-matrix solution.

5. An ink composition as defined in claim 1 in which said salt is copper acetate and is 1–3% by weight of the salt-matrix solution.

6. An ink composition including a low molecular weight matrix material of polyvinyl pyrrolidone, a copper salt dissolved therein, said copper salt being selected from the group consisting of copper chloride, copper nitrate, copper perchlorate and copper sulfate, the solution of copper salt and polyvinyl pyrrolidone being further dissolved in a vehicle to keep the same in a liquid state at room temperature and the amount of said copper salt being sufficient to erase printed characters of said ink through absorption of laser energy.

7. An ink composition as defined in claim 6 in which said salt is copper chloride.

8. An ink composition as defined in claim 7 in which said copper chloride is 2–4% by weight of the salt-matrix solution.

9. An ink composition as defined in claim 6 in which said salt is copper nitrate and is 7–9% by weight of the salt-matrix solution.

10. An ink composition as defined in claim 6 in which said salt is copper acetate and is 2–4% by weight of the salt-matrix solution.

11. An ink composition as defined in claim 6 in which said salt is copper perchlorate and is 10–14% by weight of the salt-matrix solution.

12. An ink composition as defined in claim 6 in which said salt is copper sulfate and is 2–4% by weight of the salt-matrix solution.

13. An ink composition including a low molecular weight matrix material of polyvinyl butyral, copper nitrate dissolved therein, the solution of copper nitrate and polyvinyl butyral being further dissolved in a vehicle to keep the same in a liquid state at room temperature and the amount of said copper salt being sufficient to erase printed characters of said ink through absorption of laser energy.

14. An ink composition as defined in claim 13 in which said copper nitrate is 8–10% by weight of the salt-matrix solution.

15. An ink composition including a low molecular weight matrix selected from the group consisting of polyvinyl acetate, polyvinyl pyrrolidone and polyvinyl butyral and a copper salt selected from the group consisting of copper chloride, copper perchlorate, copper nitrate, copper sulfate and copper acetate, and a liquid vehicle solvent for said matrix and salt, said vehicle being present in an amount sufficient to maintain said ink liquid at room temperature and the amount of said copper salt being sufficient to erase printed characters of said ink through absorption of laser energy.

References Cited

UNITED STATES PATENTS

| | | | |
|---|---|---|---|
| 3,460,964 | 8/1969 | Dunham | 117—36.9 |
| 2,154,389 | 4/1939 | Stoesser | 23—250 |
| 3,453,225 | 7/1969 | Pollack | 260—23 |
| 2,161,024 | 6/1939 | Doolittle | 91——70 |

OTHER REFERENCES

Vinyl and Related Polymers, Schildnecht, 1960, U.S. P.O. Grp. Hq., pp. 335–343.

ALLAN LIEBERMAN, Primary Examiner

R. ZAITLEN, Assistant Examiner

U.S. Cl. X.R.

260—29.7 M, 33.4 R, 45.75 C